(12) United States Patent
Naser et al.

(10) Patent No.: US 12,621,442 B2
(45) Date of Patent: May 5, 2026

(54) MOST PROBABLE MODE LIST GENERATION WITH TEMPLATE-BASED INTRA MODE DERIVATION AND DECODER-SIDE INTRA MODE DERIVATION

(71) Applicant: InterDigital CE Patent Holdings, SAS, Paris (FR)

(72) Inventors: Karam Naser, Mouazé (FR); Thierry Dumas, Rennes (FR); Ya Chen, Rennes (FR); Franck Galpin, Thorigne-Fouillard (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 0 days.

(21) Appl. No.: 18/721,652

(22) PCT Filed: Dec. 12, 2022

(86) PCT No.: PCT/EP2022/086853
§ 371 (c)(1),
(2) Date: Jun. 18, 2024

(87) PCT Pub. No.: WO2023/118048
PCT Pub. Date: Jun. 29, 2023

(65) Prior Publication Data
US 2025/0055981 A1 Feb. 13, 2025

(30) Foreign Application Priority Data

Dec. 21, 2021 (EP) .................................... 21306876
Jan. 12, 2022 (EP) .................................... 22305023

(51) Int. Cl.
| | |
|---|---|
| *H04N 19/11* | (2014.01) |
| *H04N 19/176* | (2014.01) |
| *H04N 19/593* | (2014.01) |

(52) U.S. Cl.
CPC ........... *H04N 19/11* (2014.11); *H04N 19/176* (2014.11); *H04N 19/593* (2014.11)

(58) Field of Classification Search
CPC .... H04N 19/11; H04N 19/157; H04N 19/593; H04N 19/176
See application file for complete search history.

(56) References Cited

U.S. PATENT DOCUMENTS

| | | | |
|---|---|---|---|
| 12,010,316 B2 * | 6/2024 | Li .......................... | H04N 19/159 |
| 2022/0232241 A1 * | 7/2022 | Wang ................... | H04N 19/176 |

(Continued)

OTHER PUBLICATIONS

By Coban et al., "Algorithm description of Enhanced Compression Model 2 (ECM 2)", JVET of ITU-T SG 16 WP 3 and ISO/IEC JTC 1/SC 29; 23rd Meeting, by teleconference; JVET-W2025, Jul. 7-16, 2021, 22 pages.*
Abdoli et al., "Non-CE3: Decoder-side Intra Mode Derivation with Prediction Fusion Using Planar", JVET-O0449-v2, ATEME, British Broadcasting Corporation, Joint Video Experts Team (JVET) of ITU-T SG 16 WP 3 and ISO/IEC JTC 1/SC 29/WG 11, 15th Meeting: Gothenburg, SE, Jul. 3-12, 2019, 9 pages.

(Continued)

*Primary Examiner* — Tsion B Owens
(74) *Attorney, Agent, or Firm* — Condo Roccia Koptiw LLP

(57) ABSTRACT
Systems, methods, and instrumentalities are disclosed for most probable mode (MPM) list generation with template-based intra mode derivation (TIMD). An example method involves determining an intra coding mode derivation process is enabled for a first coding block; based on the intra coding mode derivation process being enabled for the first coding block, generating a first MPM list for the first coding block based on a first MPM list generation process; decoding the first coding block based on the first MPM list; determining that the intra coding mode derivation process is disabled for a second coding block; based on the intra coding mode derivation process being disabled for the second coding block, generating a second MPM list for the second coding block based on a second MPM list generation (Continued)

process, different from the first MPM list generation process; and decoding the second coding block based on the second MPM list.

20 Claims, 11 Drawing Sheets

(56)                    References Cited

U.S. PATENT DOCUMENTS

| | | | |
|---|---|---|---|
| 2022/0417511 A1* | 12/2022 | Li | H04N 19/159 |
| 2023/0049154 A1* | 2/2023 | Li | H04N 19/136 |
| 2024/0283924 A1* | 8/2024 | Jhu | H04N 19/70 |
| 2024/0414354 A1* | 12/2024 | Kim | H04N 19/147 |
| 2025/0056065 A1* | 2/2025 | Zhang | H04N 19/86 |

OTHER PUBLICATIONS

Coban et al., "Algorithm description of Enhanced Compression Model 2 (ECM 2)", JVET of ITU-T SG 16 WP 3 and ISO/IEC JTC 1/SC 29; 23rd Meeting, by teleconference; JVET-W2025, Jul. 7-16, 2021, 22 pages.
Xiu et al., "Decoder-Side Intra Mode Derivation", Joint Video Exploration Team (JVET) of ITU-T SG 16 WP 3 and ISO/IEC JTC 1/SC 29/WG 11; 3rd Meeting: Geneva, CH; JVET-C0061, May 26-Jun. 1, 2016, 5 pages.
Bross, et al., "Versatile Video Coding (Draft 5)", JVET-N1001-v5, Editors, Joint Video Experts Team (JVET) of ITU-T SG 16 WP 3 and ISO/IEC JTC 1/SC 29/WG 11, 14th Meeting: Geneva, CH, Mar. 19-27, 2019, 370 pages.

* cited by examiner

MOST PROBABLE MODE LIST GENERATION WITH TEMPLATE-BASED INTRA MODE DERIVATION AND DECODER-SIDE INTRA MODE DERIVATION

CROSS-REFERENCE TO RELATED APPLICATIONS

This application is the National Stage Entry under 35 U.S.C. § 371 of Patent Cooperation Treaty Application No. PCT/EP2022/086853, filed Dec. 20, 2022, which claims the benefit of European Provisional Patent Application No. EP21306876.0, filed Dec. 21, 2021, and European Provisional Patent Application No. EP22305023.8, filed Jan. 12, 2022, the contents of which are incorporated by reference herein.

BACKGROUND

Video coding systems may be used to compress digital video signals, e.g., to reduce the storage and/or transmission bandwidth needed for such signals. Video coding systems may include, for example, block-based, wavelet-based, and/or object-based systems.

SUMMARY

Systems, methods, and instrumentalities may be provided for most probable mode (MPM) list generation using different MPM list generation processes for different coding blocks. For example, a device for video decoding may select an MPM generation process for a coding block from multiple MPM list generation processes. The device may base the selection on whether an intra coding mode derivation process is enabled for the coding block. Based on the intra coding mode derivation process being enabled for a coding block, the MPM list for the coding block may be generated based on a first MPM list generation process. Based on the intra coding mode derivation process being disabled for the coding block, the MPM list for the coding block may be generated based on a second and different MPM list generation process.

A device for video encoding may select an MPM generation process for a coding block from multiple MPM list generation processes. The device may base the selection on whether an intra coding mode derivation process is enabled for the coding block. Based on the intra coding mode derivation process being enabled for a coding block, the MPM list for the coding block may be generated based on a first MPM list generation process. Based on the intra coding mode derivation process being disabled for the coding block, the MPM list for the coding block may be generated based on a second and different MPM list generation process.

In an example, MPM list generation process, candidate intra prediction modes may be generated modes based on intra prediction modes associated with neighboring blocks of the coding block. One or more decoder-side intra mode derivation (DIMD) candidates may be derived for the coding block based on a histogram of gradients associated with reconstructed pixels neighboring the coding block. The candidate intra prediction modes and the DIMD candidate(s) are added to the MPM list for the coding block. In an example MPM list generation process, candidate intra prediction modes may be generated based on intra prediction modes associated with neighboring blocks of the coding block, and deriving candidate modes via DIMD may be bypassed. In an example MPM list generation process, candidate intra prediction modes include TIMD and DIMD derived modes. For example, the MPM list may include intra prediction mode(s) associated with neighboring blocks of the coding block, one intra mode derivation (TIMD) derived mode and/or one DIMD derived mode. For example, intra prediction modes may be tested on reconstructed pixels neighboring the first coding block, and a candidate intra prediction mode may be selected from the candidate intra prediction modes based on the testing. The selected candidate intra prediction mode may be added to the MPM list. A DIMD candidate may be derived based on a histogram of gradients associated with reconstructed samples neighboring the coding block, and the DIMD candidate may be added to the MPM list (e.g., in addition to the selected candidate intra prediction mode).

For example, the intra coding mode derivation process based on which the device may select the MPM list generation process may include a template-based process. For example, the intra coding mode derivation process may include TIMD. TIMD may include testing multiple candidate intra prediction modes in the MPM list on reconstructed pixels neighboring the coding block, and selecting a candidate intra prediction mode from the candidate intra prediction modes based on the testing. Based on TIMD being enabled for a coding block, the MPM list may be generated with DIMD bypassed. Based on TIMD being disabled for a coding block, the MPM list may be generated with DIMD.

For example, the intra coding mode derivation process, which the device may use to select the MPM list generation process, may be associated with a combined intra-inter prediction (CIIP). Based on CIIP being enabled for a coding block, the MPM list may be generated with DIMD bypassed. Based on TIMD being disabled for a coding block, the MPM list may be generated with DIMD.

Systems, methods, and instrumentalities described herein may involve a decoder. In some examples, the systems, methods, and instrumentalities described herein may involve an encoder. In some examples, the systems, methods, and instrumentalities described herein may involve a signal (e.g., from an encoder and/or received by a decoder). A computer-readable medium may include instructions for causing one or more processors to perform methods described herein. A computer program product may include instructions which, when the program is executed by one or more processors, may cause the one or more processors to carry out the methods described herein.

DETAILED DESCRIPTION

A more detailed understanding may be had from the following description, given by way of example in conjunction with the accompanying drawings.

Figure 1A:
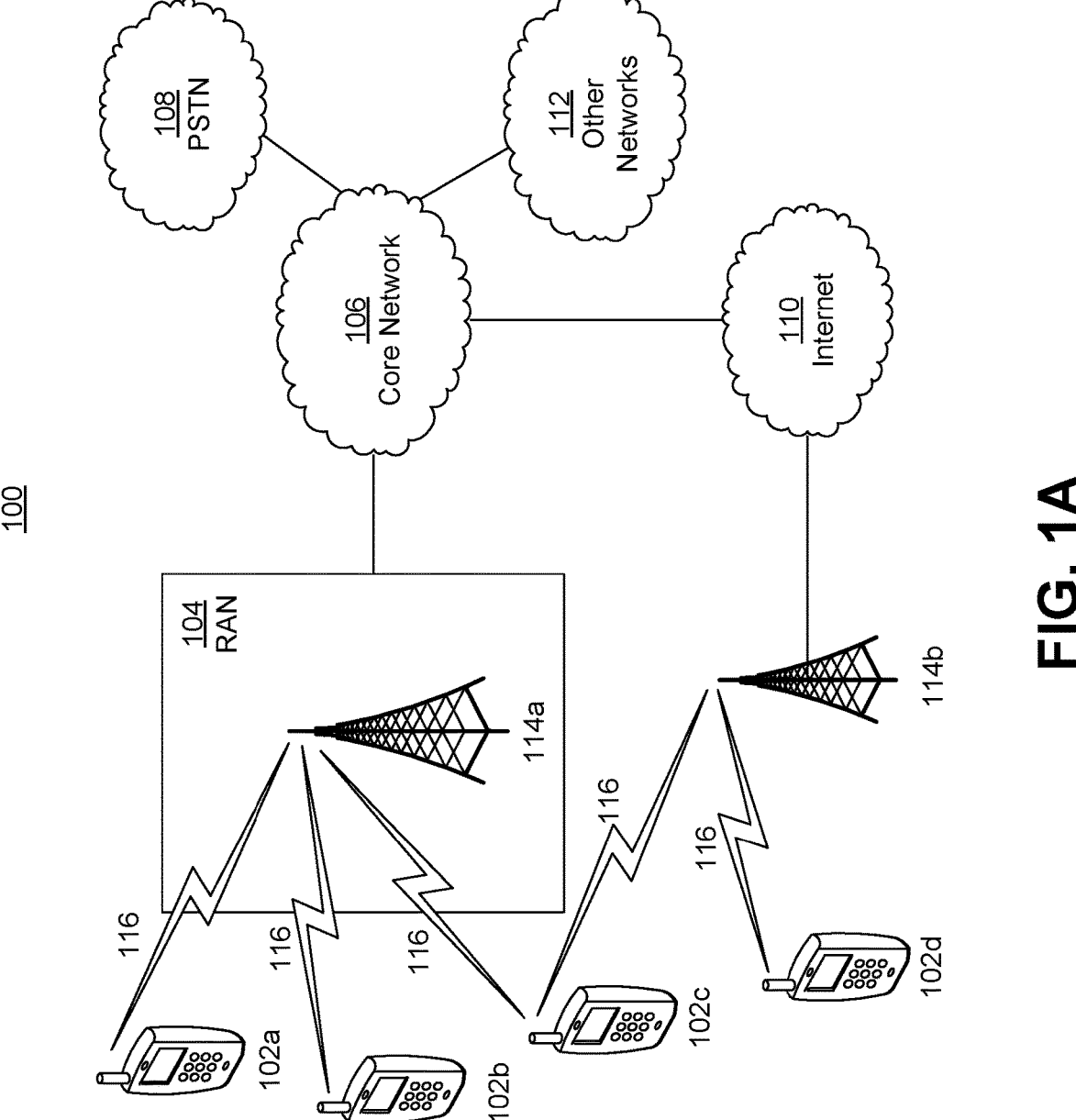
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
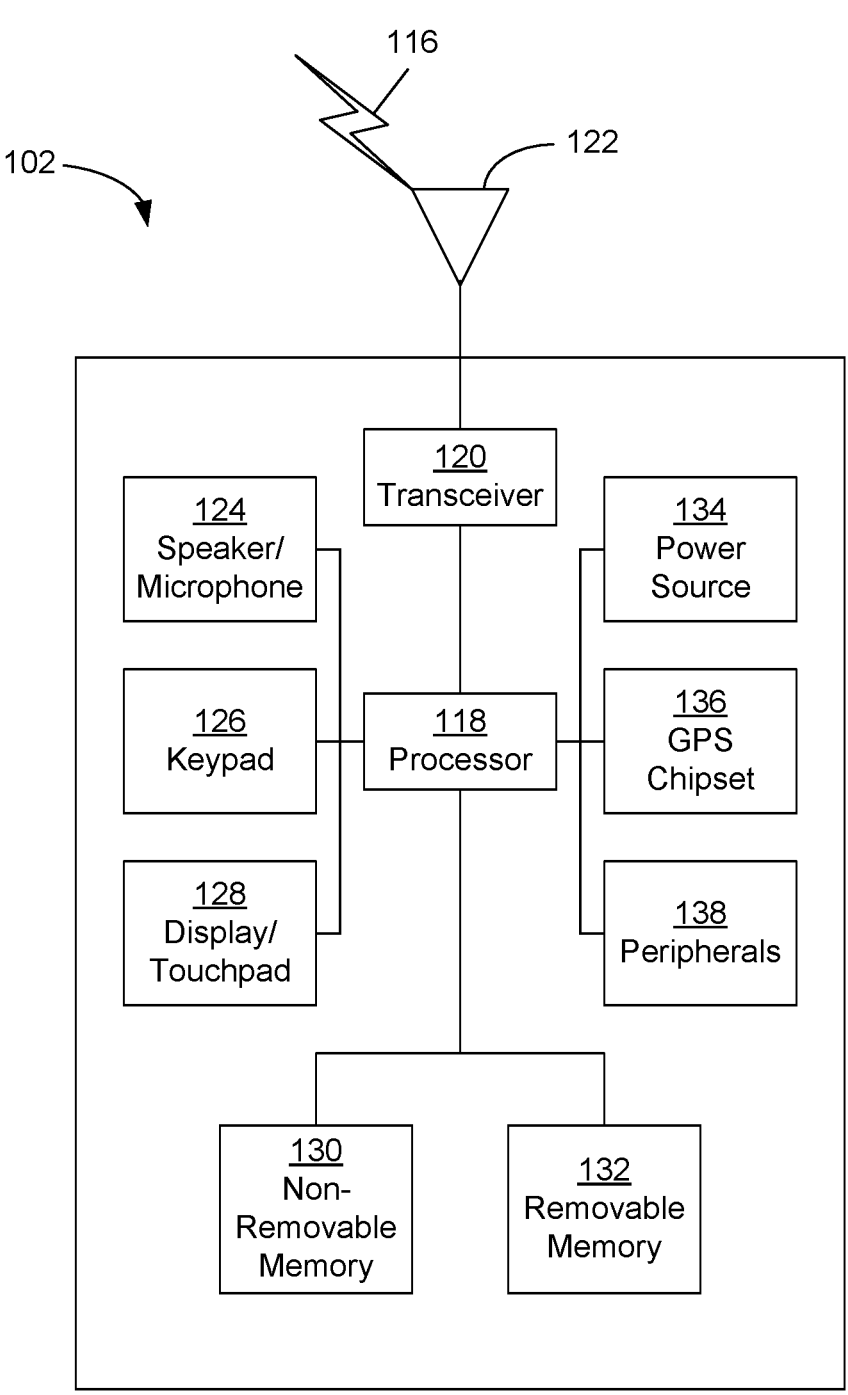
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth© module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
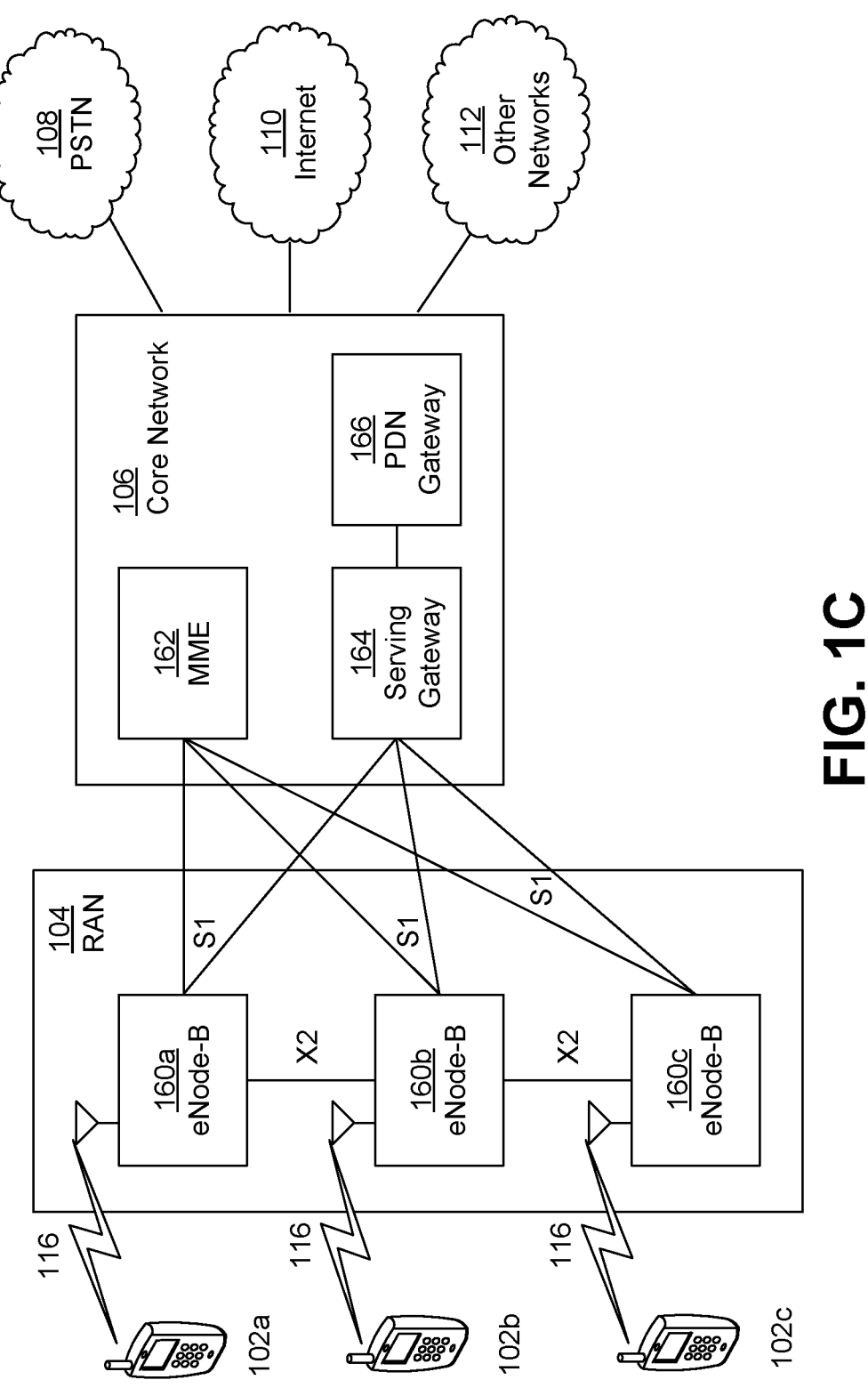
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above-described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
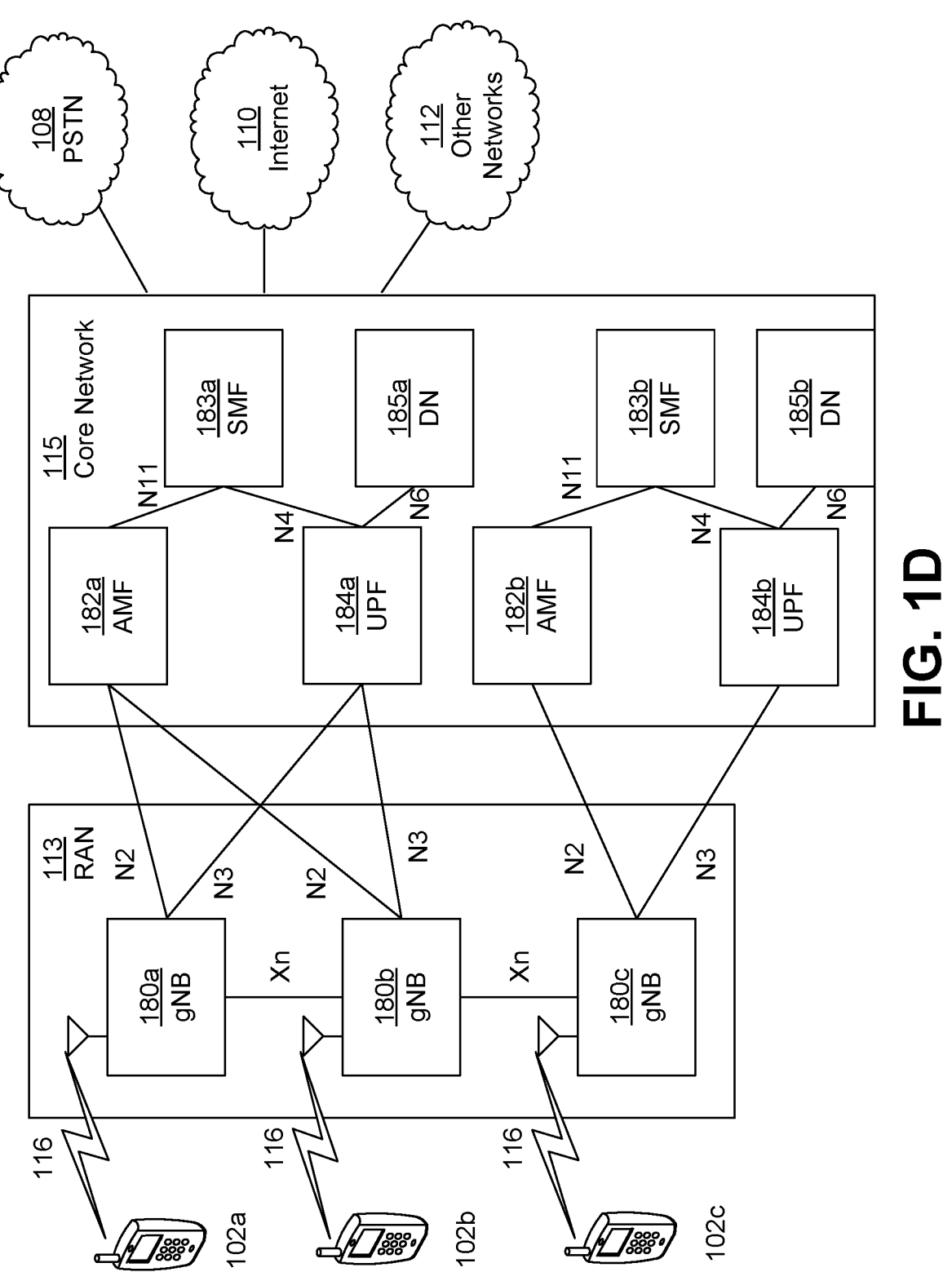
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*,184*b*, at least one Session Management Function (SMF) 183*a*, 183*b*, and possibly a Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different PDU sessions with different requirements), selecting a particular SMF 183*a*, 183*b*, management of the registration area, termination of NAS signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

This application describes a variety of aspects, including tools, features, examples, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects may be combined and interchanged to provide further aspects. Moreover, the aspects may be combined and interchanged with aspects described in earlier filings as well.

The aspects described and contemplated in this application may be implemented in many different forms. FIGS. 5-8 described herein may provide some examples, but other examples are contemplated. The discussion of FIGS. 5-8 does not limit the breadth of the implementations. At least one of the aspects generally relates to video encoding and decoding, and at least one other aspect generally relates to transmitting a bitstream generated or encoded. These and other aspects may be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture," and "frame" may be used interchangeably.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various examples to modify an element, component, step, operation, etc., such as, for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Figure 2:
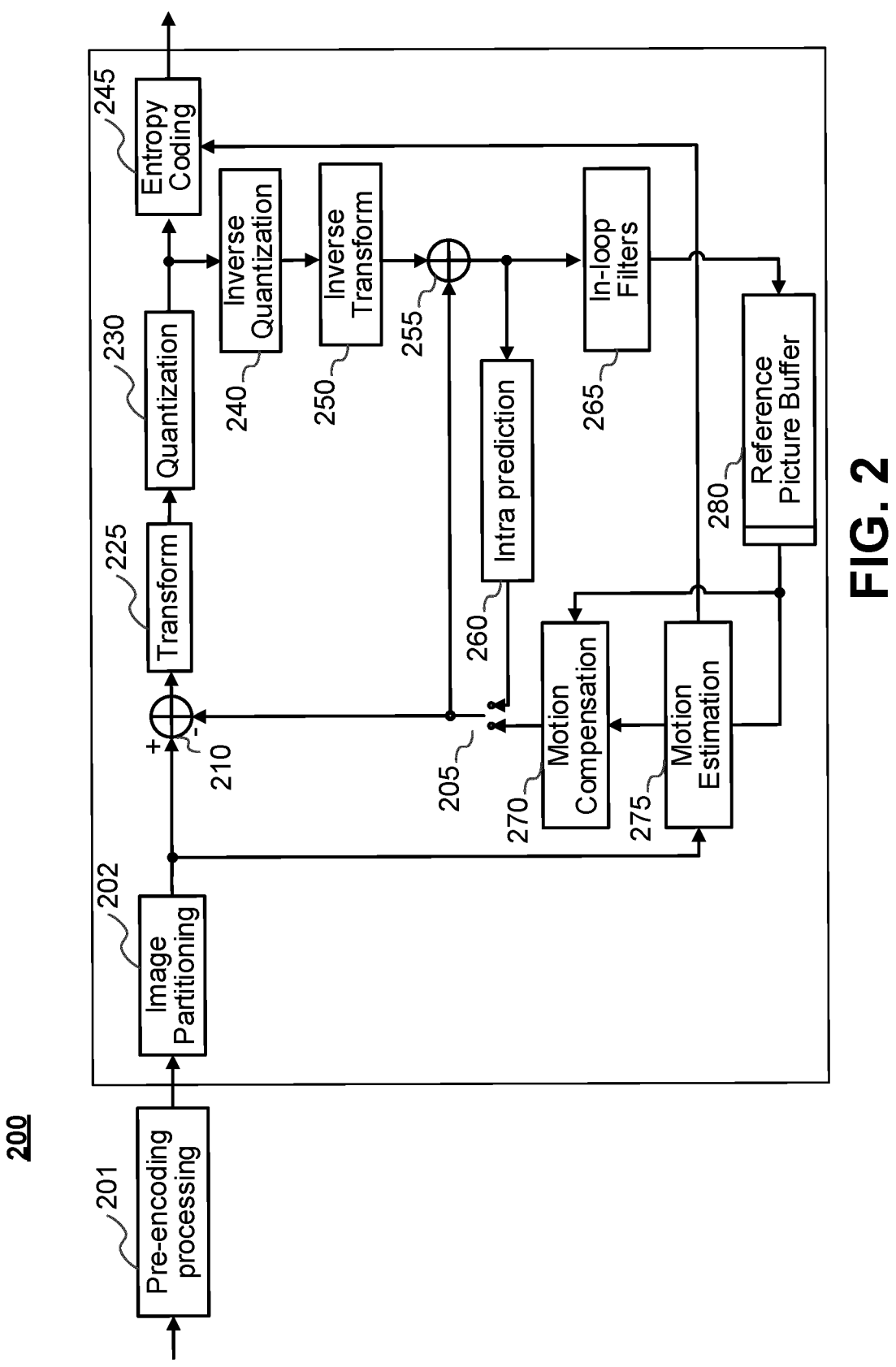
FIG. 2 illustrates an example video encoder.
Figure 3:
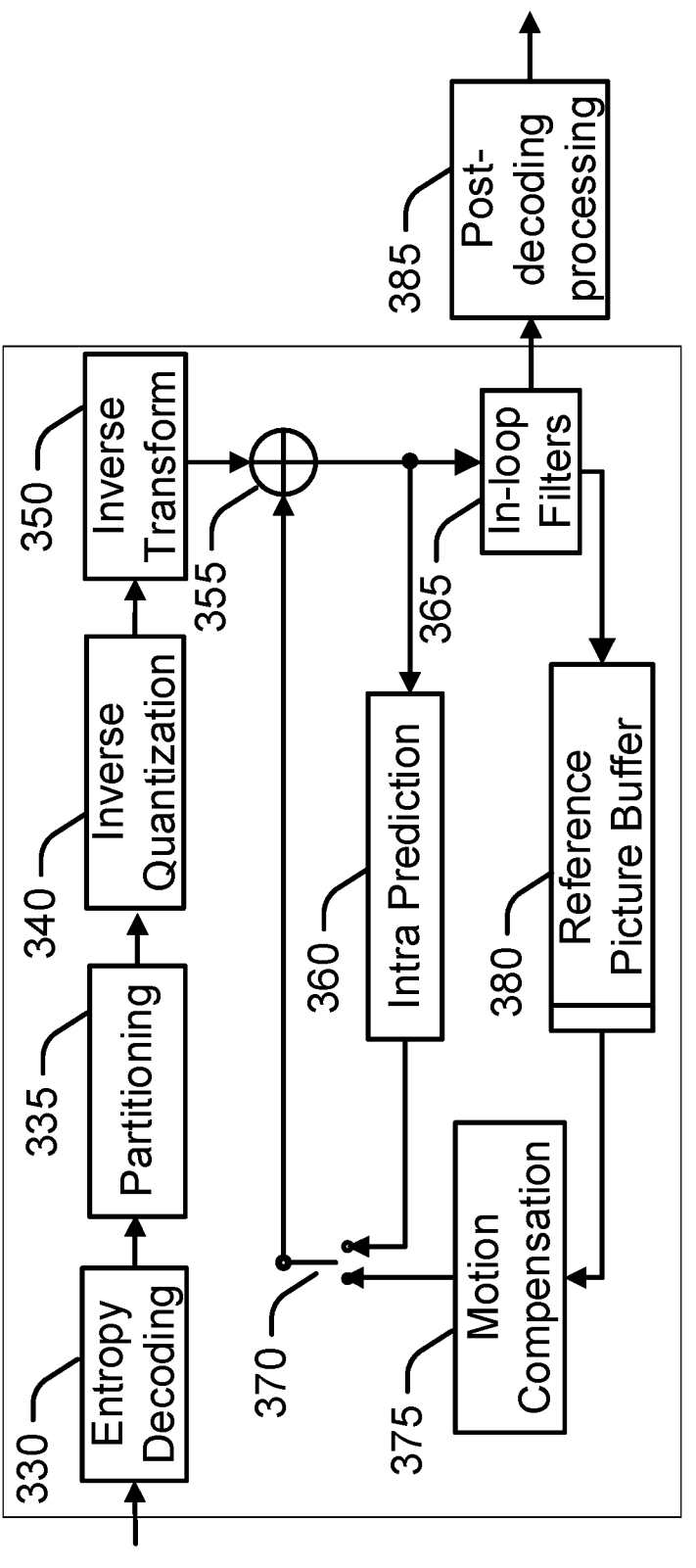
FIG. 3 illustrates an example video decoder.

Various methods and other aspects described in this application may be used to modify modules, for example, decoding modules, of a video encoder 200 and decoder 300 as shown in FIG. 2 and FIG. 3. Moreover, the subject matter disclosed herein may be applied, for example, to any type, format or version of video coding, whether described in a standard or a recommendation, whether pre-existing or future-developed, and extensions of any such standards and recommendations. Unless indicated otherwise, or technically precluded, the aspects described in this application may be used individually or in combination.

Various numeric values are used in examples described the present application, such as 2, 4, 6, 8, 16, 22, 32, 64 etc. These and other specific values are for purposes of describing examples and the aspects described are not limited to these specific values.

FIG. 2 is a diagram showing an example video encoder. Variations of example encoder 200 are contemplated, but the encoder 200 is described below for purposes of clarity without describing all expected variations.

Before being encoded, the video sequence may go through pre-encoding processing (201), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata may be associated with the pre-processing and attached to the bitstream.

In the encoder 200, a picture is encoded by the encoder elements as described below. The picture to be encoded is partitioned (202) and processed in units of, for example, coding units (CUs). Each unit is encoded using, for example, either an intra or inter mode. When a unit is encoded in an intra mode, it performs intra prediction (260). In an inter mode, motion estimation (275) and compensation (270) are performed. The encoder decides (205) which one of the intra mode or inter mode to use for encoding the unit, and indicates the intra/inter decision by, for example, a prediction mode flag. Prediction residuals are calculated, for example, by subtracting (210) the predicted block from the original image block.

The prediction residuals are then transformed (225) and quantized (230). The quantized transform coefficients, as well as motion vectors and other syntax elements, are entropy coded (245) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (240) and inverse transformed (250) to decode prediction residuals. Combining (255) the decoded prediction residuals and the predicted block, an image block is reconstructed. In-loop filters (265) are applied to the reconstructed picture to perform, for example, deblocking/SAO (Sample Adaptive Offset) filtering to reduce encoding artifacts. The filtered image is stored at a reference picture buffer (280).

FIG. 3 is a diagram showing an example of a video decoder. In example decoder 300, a bitstream is decoded by the decoder elements as described below. Video decoder 300 generally performs a decoding pass reciprocal to the encoding pass as described in FIG. 2. The encoder 200 also generally performs video decoding as part of encoding video data.

In particular, the input of the decoder includes a video bitstream, which may be generated by video encoder 200. The bitstream is first entropy decoded (330) to obtain transform coefficients, motion vectors, and other coded information. The picture partition information indicates how the picture is partitioned. The decoder may therefore divide (335) the picture according to the decoded picture partitioning information. The transform coefficients are de-quantized (340) and inverse transformed (350) to decode the prediction residuals. Combining (355) the decoded prediction residuals and the predicted block, an image block is reconstructed. The predicted block may be obtained (370) from intra prediction (360) or motion-compensated prediction (i.e., inter prediction) (375). In-loop filters (365) are applied to the reconstructed image. The filtered image is stored at a reference picture buffer (380).

The decoded picture can further go through post-decoding processing (385), for example, an inverse color transform (e.g., conversion from YCbCr 4:2:0 to RGB 4:4:4) or an inverse remapping performing the inverse of the remapping process performed in the pre-encoding processing (201). The post-decoding processing can use metadata derived in the pre-encoding processing and signaled in the bitstream. In an example, the decoded images (e.g., after application of the in-loop filters (365) and/or after post-decoding processing (385), if post-decoding processing is used) may be sent to a display device for rendering to a user.

Figure 4:
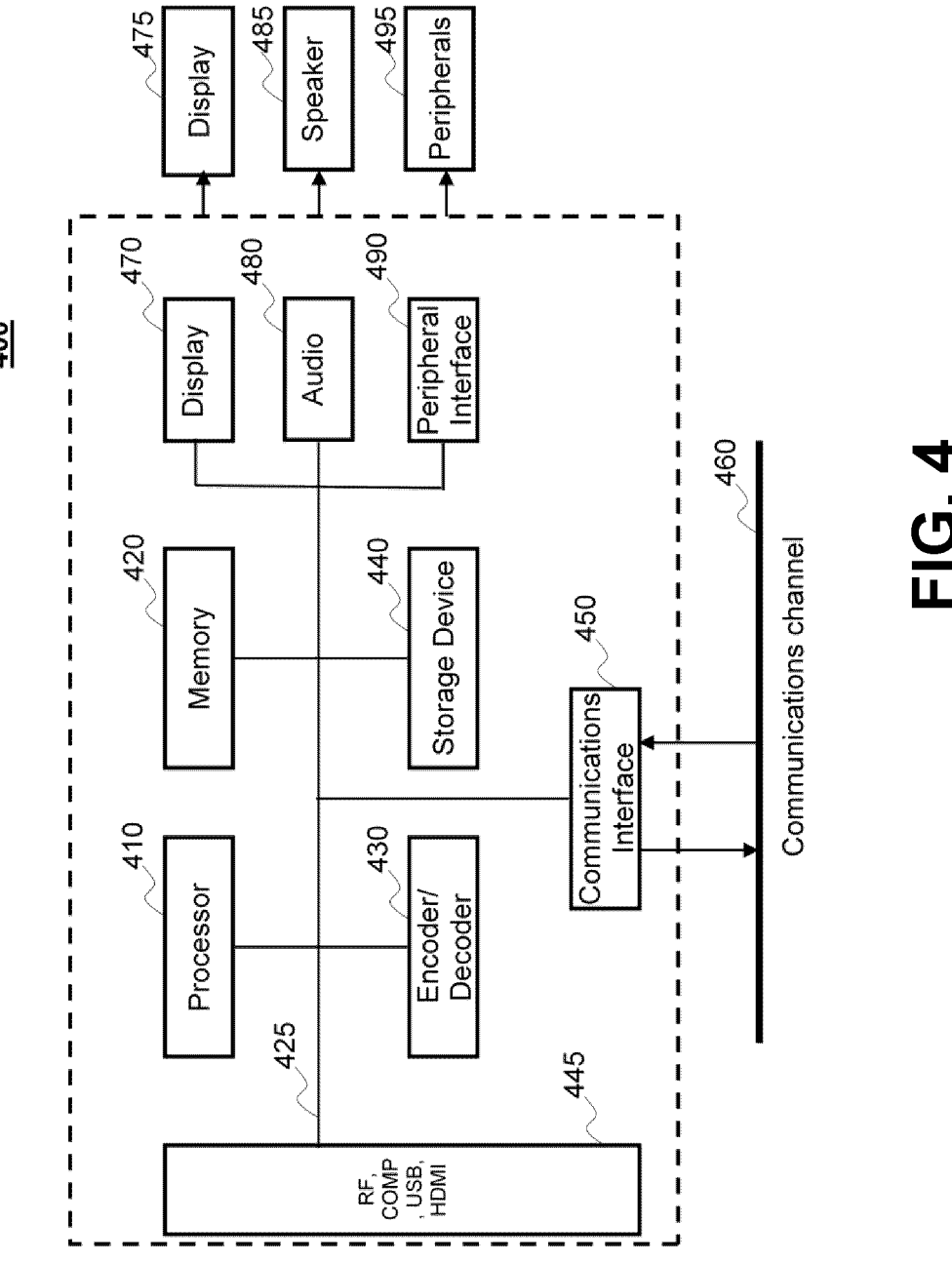
FIG. 4 illustrates an example of a system in which various aspects and examples may be implemented.

FIG. 4 is a diagram showing an example of a system in which various aspects and examples described herein may be implemented. System 400 may be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 400, singly or in combination, may be embodied in a single integrated circuit (IC), multiple ICs, and/or discrete components. For example, in at least one example, the processing and encoder/decoder elements of system 400 are distributed across multiple ICs and/or discrete components. In various examples, the system 400 is communicatively coupled to one or more other systems, or other electronic devices, via, for example, a communications bus or through dedicated input and/or output ports. In various examples, the system 400 is configured to implement one or more of the aspects described in this document.

The system 400 includes at least one processor 410 configured to execute instructions loaded therein for implementing, for example, the various aspects described in this document. Processor 410 can include embedded memory, input output interface, and various other circuitries as known in the art. The system 400 includes at least one memory 420 (e.g., a volatile memory device, and/or a non-volatile memory device). System 400 includes a storage device 440, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 440 can include an internal storage device, an attached storage device (including detachable and non-detachable storage devices), and/or a network accessible storage device, as non-limiting examples.

System 400 includes an encoder/decoder module 430 configured, for example, to process data to provide an encoded video or decoded video, and the encoder/decoder module 430 can include its own processor and memory. The encoder/decoder module 430 represents module(s) that may be included in a device to perform the encoding and/or decoding functions. As is known, a device can include one or both of the encoding and decoding modules. Additionally, encoder/decoder module 430 may be implemented as a separate element of system 400 or may be incorporated within processor 410 as a combination of hardware and software as known to those skilled in the art.

Program code to be loaded onto processor 410 or encoder/decoder 430 to perform the various aspects described in this document may be stored in storage device 440 and subsequently loaded onto memory 420 for execution by processor 410. In accordance with various examples, one or more of processor 410, memory 420, storage device 440, and encoder/decoder module 430 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some examples, memory inside of the processor 410 and/or the encoder/decoder module 430 is used to store instructions and to provide working memory for processing that is needed during encoding or decoding. In other examples, however, a memory external to the processing device (for example, the processing device may be either the processor 410 or the encoder/decoder module 430) is used for one or more of these functions. The external memory may be the memory 420 and/or the storage device 440, for example, a dynamic volatile memory and/or a non-volatile flash memory. In several examples, an external non-volatile flash memory is used to store the operating system of, for example, a television. In at least one example, a fast external dynamic volatile memory such as a RAM is used as working memory for video encoding and decoding operations.

The input to the elements of system 400 may be provided through various input devices as indicated in block 445. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 4, include composite video.

In various examples, the input devices of block 445 have associated respective input processing elements as known in the art. For example, the RF portion may be associated with elements suitable for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which may be referred to as a channel in certain examples, (iv) demodulating the down-converted and band-limited signal, (v) performing error correction, and/or (vi) demultiplexing to select the desired stream of data packets. The RF portion of various examples includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, down-converting the received signal to a lower frequency (for example, an intermediate frequency or a near-baseband frequency) or to baseband. In one set-top box example, the RF portion and its associated input processing element receives an RF signal transmitted over a wired (for example, cable) medium, and performs frequency selection by filtering, down-converting, and filtering again to a desired frequency band. Various examples rearrange the order of the above-described (and other) elements, remove some of these elements, and/or add other elements performing similar or different functions. Adding elements can include inserting elements in between existing elements, such as, for example, inserting amplifiers and an analog-to-digital converter. In various examples, the RF portion includes an antenna.

The USB and/or HDMI terminals can include respective interface processors for connecting system 400 to other electronic devices across USB and/or HDMI connections. It is to be understood that various aspects of input processing, for example, Reed-Solomon error correction, may be implemented, for example, within a separate input processing IC or within processor 410 as necessary. Similarly, aspects of USB or HDMI interface processing may be implemented within separate interface ICs or within processor 410 as necessary. The demodulated, error corrected, and demultiplexed stream is provided to various processing elements, including, for example, processor 410, and encoder/decoder 430 operating in combination with the memory and storage elements to process the data stream as necessary for presentation on an output device.

Various elements of system 400 may be provided within an integrated housing, Within the integrated housing, the various elements may be interconnected and transmit data therebetween using suitable connection arrangement 425, for example, an internal bus as known in the art, including the Inter-IC (I2C) bus, wiring, and printed circuit boards.

The system 400 includes communication interface 450 that enables communication with other devices via communication channel 460. The communication interface 450 can include, but is not limited to, a transceiver configured to transmit and to receive data over communication channel 460. The communication interface 450 can include, but is not limited to, a modem or network card and the communication channel 460 may be implemented, for example, within a wired and/or a wireless medium.

Data is streamed, or otherwise provided, to the system 400, in various examples, using a wireless network such as a Wi-Fi network, for example IEEE 802.11 (IEEE refers to the Institute of Electrical and Electronics Engineers). The Wi-Fi signal of these examples is received over the communications channel 460 and the communications interface 450 which are adapted for Wi-Fi communications. The communications channel 460 of these examples is typically connected to an access point or router that provides access to external networks including the Internet for allowing streaming applications and other over-the-top communications. Other examples provide streamed data to the system 400 using a set-top box that delivers the data over the HDMI connection of the input block 445. Still other examples provide streamed data to the system 400 using the RF connection of the input block 445. As indicated above, various examples provide data in a non-streaming manner. Additionally, various examples use wireless networks other than Wi-Fi, for example a cellular network or a Bluetooth© network.

The system 400 can provide an output signal to various output devices, including a display 475, speakers 485, and other peripheral devices 495. The display 475 of various examples includes one or more of, for example, a touch-screen display, an organic light-emitting diode (OLED) display, a curved display, and/or a foldable display. The display 475 may be for a television, a tablet, a laptop, a cell phone (mobile phone), or other device. The display 475 can also be integrated with other components (for example, as in a smart phone), or separate (for example, an external monitor for a laptop). The other peripheral devices 495 include, in various examples, one or more of a stand-alone digital video disc (or digital versatile disc) (DVD, for both terms), a disk player, a stereo system, and/or a lighting system. Various examples use one or more peripheral devices 495 that provide a function based on the output of the system 400. For example, a disk player performs the function of playing the output of the system 400.

In various examples, control signals are communicated between the system 400 and the display 475, speakers 485, or other peripheral devices 495 using signaling such as AV.Link, Consumer Electronics Control (CEC), or other communications protocols that enable device-to-device control with or without user intervention. The output devices may be communicatively coupled to system 400 via dedicated connections through respective interfaces 470, 480, and 490. Alternatively, the output devices may be connected to system 400 using the communications channel 460 via the communications interface 450. The display 475 and speakers 485 may be integrated in a single unit with the other components of system 400 in an electronic device such as, for example, a television. In various examples, the display interface 470 includes a display driver, such as, for example, a timing controller (T Con) chip.

The display 475 and speakers 485 can alternatively be separate from one or more of the other components, for example, if the RF portion of input 445 is part of a separate set-top box. In various examples in which the display 475 and speakers 485 are external components, the output signal may be provided via dedicated output connections, including, for example, HDMI ports, USB ports, or COMP outputs.

The examples may be carried out by computer software implemented by the processor 410 or by hardware, or by a combination of hardware and software. As a non-limiting example, the examples may be implemented by one or more integrated circuits. The memory 420 may be of any type appropriate to the technical environment and may be implemented using any appropriate data storage technology, such as optical memory devices, magnetic memory devices, semiconductor-based memory devices, fixed memory, and removable memory, as non-limiting examples. The processor 410 may be of any type appropriate to the technical environment, and can encompass one or more of microprocessors, general purpose computers, special purpose computers, and processors based on a multi-core architecture, as non-limiting examples.

Various implementations involve decoding. "Decoding," as used in this application, can encompass all or part of the processes performed, for example, on a received encoded sequence to produce a final output suitable for display. In various examples, such processes include one or more of the processes typically performed by a decoder, for example, entropy decoding, inverse quantization, inverse transformation, and differential decoding. In various examples, such processes also, or alternatively, include processes performed by a decoder of various implementations described in this application, for example, determining an intra coding mode derivation process is enabled for a first coding block, based on the intra coding mode derivation process being enabled for the first coding block, generating a first most probable mode (MPM) list for the first coding block based on a first MPM list generation process, decoding the first coding block based on the first MPM list, determining that the intra coding mode derivation process is disabled for a second coding block, based on the intra coding mode derivation process being disabled for the second coding block, generating a second MPM list for the second coding block based on a second MPM list generation process, different from the first MPM list generation process, and decoding the second coding block based on the second MPM list, etc.

As further examples, in one example "decoding" refers only to entropy decoding, in another example "decoding" refers only to differential decoding, and in another example "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding," "encoding" as used in this application can encompass all or part of the processes performed, for example, on an input video sequence to produce an encoded bitstream. In various examples, such processes include one or more of the processes typically performed by an encoder, for example, partitioning, differential encoding, transformation, quantization, and entropy encoding. In various examples, such processes also, or alternatively, include processes performed by an encoder of various implementations described in this application, for example, determining an intra coding mode derivation process is enabled for a first coding block, based on the intra coding mode derivation process being enabled for the first coding block, generating a first most probable mode (MPM) list for the first coding block based on a first MPM list generation process, encoding the first coding block based on the first MPM list, determining that the intra coding mode derivation process is disabled for a second coding block, based on the intra coding mode derivation process being disabled for the second coding block, generating a second MPM list for the second coding block based on a second MPM list generation process, different from the first MPM list generation process, and encoding the second coding block based on the second MPM list, etc.

As further examples, in one example "encoding" refers only to entropy encoding, in another example "encoding" refers only to differential encoding, and in another example "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that syntax elements as used herein, for example, coding syntax indicating primary most probable mode (PMPM), DIMD, TIMD, secondary most probable mode (SMPM), etc., are descriptive terms. As such, they do not preclude the use of other syntax element names.

When a figure is presented as a flow diagram, it should be understood that the figure also provides a block diagram of a corresponding apparatus. Similarly, when a figure is presented as a block diagram, it should be understood that the figure also provides a flow diagram of a corresponding method/process.

The implementations and aspects described herein may be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus may be implemented in, for example, appropriate hardware, software, and firmware. The methods may be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one example" or "an example" or "one implementation" or "an implementation", as well as other variations thereof, means that a particular feature, structure, characteristic, and so forth described in connection with the example is included in at least one example. Thus, the appearances of the phrase "in one example" or "in an example" or "in one implementation" or "in an implementation", as well any other variations, appearing in various places throughout this application are not necessarily all referring to the same example.

Additionally, this application may refer to "determining" various pieces of information. Determining the information can include one or more of, for example, estimating the information, calculating the information, predicting the information, or retrieving the information from memory. Obtaining may include receiving, retrieving, constructing, generating, and/or determining.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. Encoder signals may include, for example, an indication of PMPM, DIMD, TIMD, SMPM, etc. In this way, in an example the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various examples. It is to be appreciated that signaling may be accomplished in a variety of ways. For example, one or more syntax elements, flags, and so forth are used to signal information to a corresponding decoder in various examples. While the preceding relates to the verb form of the word "signal", the word "signal" can also be used herein as a noun.

As will be evident to one of ordinary skill in the art, implementations may produce a variety of signals formatted to carry information that may be, for example, stored or transmitted. The information can include, for example, instructions for performing a method, or data produced by one of the described implementations. For example, a signal may be formatted to carry the bitstream of a described example. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on, or accessed or received from, a processor-readable medium.

Many examples are described herein. Features of examples may be provided alone or in any combination, across various claim categories and types. Further, examples may include one or more of the features, devices, or aspects described herein, alone or in any combination, across various claim categories and types. For example, features described herein may be implemented in a bitstream or signal that includes information generated as described herein. The information may allow a decoder to decode a bitstream, the encoder, bitstream, and/or decoder according to any of the embodiments described. For example, features described herein may be implemented by creating and/or transmitting and/or receiving and/or decoding a bitstream or signal. For example, features described herein may be implemented a method, process, apparatus, medium storing instructions, medium storing data, or signal. For example, features described herein may be implemented by a TV, set-top box, cell phone, tablet, or other electronic device that performs decoding. The TV, set-top box, cell phone, tablet, or other electronic device may display (e.g., using a monitor, screen, or other type of display) a resulting image (e.g., an image from residual reconstruction of the video bitstream). The TV, set-top box, cell phone, tablet, or other electronic device may receive a signal including an encoded image and perform decoding.

In intra coding, one or more most probable mode (MPM) list(s) may be generated. An MPM list may include the most probable candidate modes for a coding block, such as a prediction unit (PU) (e.g., a current PU). In some examples, the MPM list(s) may include candidate intra prediction mode(s) derived via template-based intra mode derivation (TIMD).

The encoder may select a prediction mode (e.g., the best prediction mode among a list of prediction modes. The encoder may signal an index for the selected predication mode to the decoder to perform the same prediction. A set of most probable modes may be selected. For example, two MPM lists may be used, where the first list may include six MPMs and the second list may include 16 MPMs.

Decoder-side intra mode derivation (DIMD) and/or TIMD may be performed to derive candidate intra-prediction mode(s) for a coding block. For example, the reconstructed pixels surrounding the current block (e.g., template pixels) may be used to derive the intra prediction mode(s). For example, template samples on the top and left directions may be used to derive the intra prediction mode(s). In DIMD, the reconstructed template samples may be analyzed to deduce the directionality of the template. One or more direction mode(s), such as two directional modes, may be selected based on the deduced the directionality of the template. A prediction signal of the current block may be generated from blending those two modes with planar mode.

For example, in DIMD, two intra modes may be derived from the reconstructed neighbor samples. The two intra modes (e.g., predictors) may be combined with the planar mode predictor with the weights derived from gradients. The division operations in weight derivation may be performed utilizing a lookup table (LUT) based integerization scheme (e.g., a scheme used by the cross-complaint linear model (CCLM)). For example, the division operation in the orientation calculation $$\text{Orient} = G_y/G_x$$

may be computed by the following example LUT-based scheme:

$$x = \text{Floor}(\text{Log } 2(Gx))$$

$$\text{normDiff} = ((Gx << 4) >> x) \& 15$$

$$x += (3 + (\text{normDiff} != 0)?1:0)$$

$$\text{Orient} = (Gy*(\text{DivSigTable}[\text{normDiff}]|8) + (1 << (x-1))) >> x,$$

where $$\text{DivSigTable}[16] = \{0,7,6,5,5,4,4,3,3,2,2,1,1,1,1,0\}.$$

Derived intra modes may be included in an MPM list such as the primary MPM list, and the DIMD process may be performed before the MPM list is constructed. The primary derived intra mode of a DIMD block may be stored with a block and may be used for MPM list construction of the neighboring blocks. In examples, the MPM list(s) may include the mode(s) generated from DIMD.

In TIMD, intra prediction modes may be tested on the template of reconstructed pixels (e.g., reconstructed pixels neighboring a current block). One or more candidate intra prediction modes may be selected from the tested modes (e.g., based on the testing). For example, the two best modes may be selected (e.g., the modes which minimize the sum of absolute transform difference (SATD) between the template of reconstructed pixels and its prediction). The prediction signal may be generated from blending those two modes.

Figure 5:
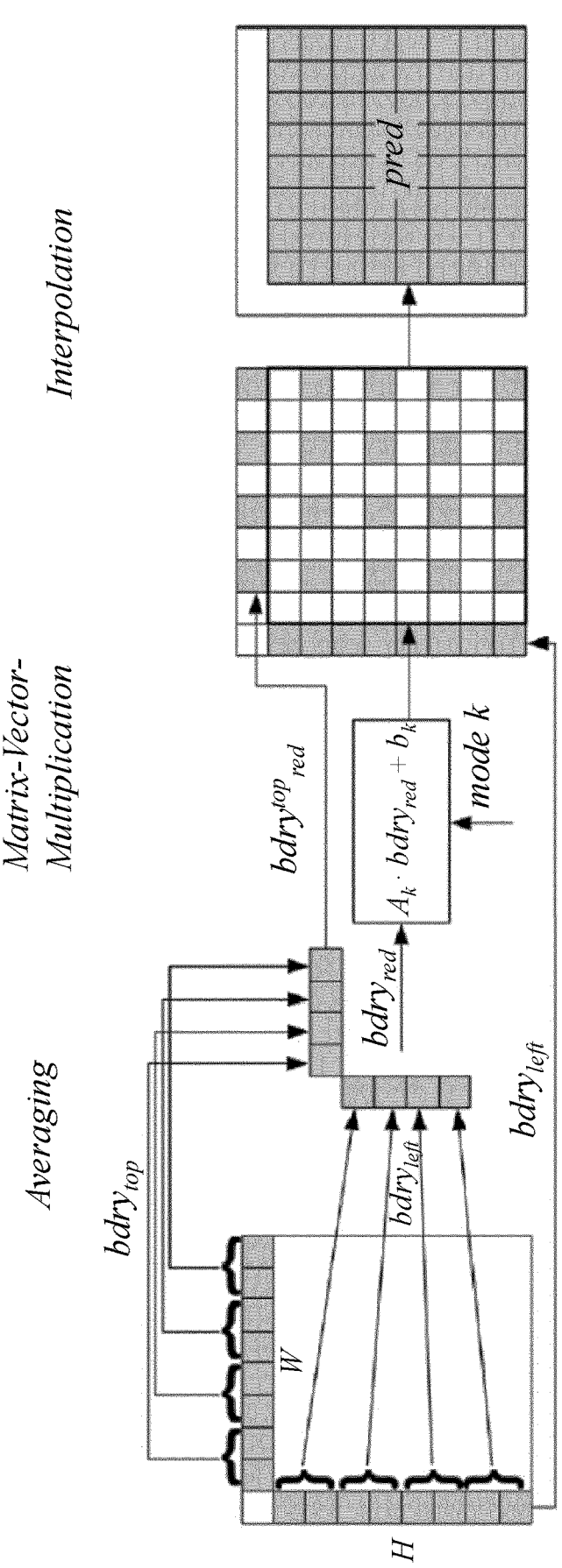
FIG. 5 shows an example of matrix weighted intra prediction (MIP).

FIG. 5 shows an example of matrix-weighted intra prediction (MIP). For predicting the samples of a rectangular block of width W and height H, MIP may take one line of H reconstructed neighboring boundary samples left of the block and one line of W reconstructed neighboring boundary samples above the block as input. In examples, if the reconstructed samples are unavailable, predicated samples may be used as input. The generation of the prediction signal may be based on averaging, matrix vector multiplication, and linear interpolation as shown with respect to FIG. 5.

Among the boundary samples, four samples or eight samples may be selected by averaging based on block size and/or shape. The input boundaries $bdry^{top}$ and $bdry^{left}$ may be reduced to smaller boundaries $$bdry_{red}^{top} \text{ and } bdry_{red}^{left}$$

by averaging neighboring boundary samples according to a predefined rule that depends on block size. The two reduced boundaries $$bdry_{red}^{top} \text{ and } bdry_{red}^{left}$$

may be concatenated to a reduced boundary vector $bdry_{red}$, which may be of size four for blocks of shape 4×4 and of size eight for blocks of other shapes (e.g., all other shapes). In examples, if mode refers to the MIP-mode, the concatenation may be defined as follows:

$$y_{red} = \begin{cases} \left[bdry_{red}^{top}, bdry_{red}^{left}\right] & \text{for } W = H = 4 \text{ and mode} < 18 \\ \left[bdry_{red}^{left}, bdry_{red}^{top}\right] & \text{for } W = H = 4 \text{ and mode} \geq 18 \\ \left[bdry_{red}^{top}, bdry_{red}^{left}\right] & \text{for } \max(W, H) = 8 \text{ and mode} < 10 \\ \left[bdry_{red}^{left}, bdry_{red}^{top}\right] & \text{for } \max(W, H) = 8 \text{ and mode} \geq 10 \\ \left[bdry_{red}^{top}, bdry_{red}^{left}\right] & \text{for } \max(W, H) > 8 \text{ and mode} < 6 \\ \left[bdry_{red}^{left}, bdry_{red}^{top}\right] & \text{for } \max(W, H) > 8 \text{ and mode} \geq 6 \end{cases}$$

Matrix multiplication may include a matrix vector multiplication, e.g., followed by addition of an offset, which may be carried out with the averaged samples as an input. The result may be a reduced prediction signal on a subsampled set of samples in the original block. Out of the reduced input vector $bdry_{red}$, a reduced prediction signal $pred_{red}$, (e.g., which may be a signal on the down-sampled block of width $W_{red}$ and height $H_{red}$) may be generated. In such a case, $W_{red}$ and $H_{red}$ may be defined as:

$$W_{red} = \begin{cases} 4 & \text{for } \max(W, H) \leq 8 \\ \min(W, 8) & \text{for } \max(W, H) > 8 \end{cases}$$

$$H_{red} = \begin{cases} 4 & \text{for } \max(W, H) \leq 8 \\ \min(H, 8) & \text{for } \max(W, H) > 8 \end{cases}$$

The reduced prediction signal $pred_{red}$ may be computed by calculating a matrix vector product and adding an offset:

$$pred_{red} = A \cdot bdry_{red} + b.$$

In such a case, matrix A may be or may include a matrix that has $W_{red} \cdot H_{red}$ rows and 4 columns if W=H=4 and 8 columns in all other cases. Parameter b may be or may include a vector of size $W_{red} \cdot H_{red}$. The matrix A and the offset vector b may be taken from one of the sets $S_0$, $S_1$, $S_2$. An index idx=idx(W, H) may be obtained as follows:

$$idx(W, H) = \begin{cases} 0 & \text{for } W = H = 4 \\ 1 & \text{for } \max(W, H) = 8 \\ 2 & \text{for } \max(W, H) > 8. \end{cases}$$

In such a case, a coefficient of the matrix A may be represented with 8-bit precision. The set $S_0$ may comprise 16 matrices $$A_0^i,$$

$i \in \{0, \ldots, 15\}$, which may have 16 rows and 4 columns and 16 offset vectors $$b_0^i,$$

$i \in \{0, \ldots, 16\}$ of size 16. Matrices and offset vectors of that set may be used for blocks of size 4×4. The set $S_1$ may comprise 8 matrices $$A_1^i,$$

$i \in \{0, \ldots, 7\}$, which may have 16 rows and 8 columns and 8 offset vectors $$b_1^i,$$

$i \in \{0, \ldots, 7\}$ of size 16. The set $S_2$ may comprise 6 matrices $$A_2^i,$$

$i \in \{0, \ldots, 5\}$, which may have 64 rows and 8 columns and of 6 offset vectors $$b_2^i,$$

$i \in \{0, \ldots, 5\}$ of size 64.

Interpolation may be used to generate the prediction signal, e.g., at the remaining positions. The prediction signal at the remaining positions may be generated from the prediction signal on the subsampled set by linear interpolation, for example, which may be a single-step linear interpolation in some directions. The interpolation may be performed in the horizontal direction and in the vertical direction. For example, the interpolation may be performed first in the horizontal direction and then in the vertical direction (e.g., regardless of block shape or block size).

Signaling of MIP mode and harmonization with other coding tools may be provided. For a CU in intra mode, a flag indicating whether an MIP mode is to be applied or not may be included in video data (e.g., video bitstream). If an MIP mode is to be applied, the MIP mode (predModeIntra) may be signaled. For an MIP mode, a transposed flag (isTransposed) (e.g., which may indicate whether the mode is transposed) and an MIP mode Id (modeId) (e.g., which may indicate which matrix is to be used for the given MIP mode) may be derived as follows:

$$isTransposed = predModeIntra \,\&\, 1$$

$$modeId = predModeIntra \gg 1$$

MIP coding mode may be harmonized with other coding tools by considering one or more of the following: low-frequency non-separable transform (LFNST) being enabled for MIP on large blocks (e.g., the LFNST transforms of planar mode are used); the reference sample derivation for MIP being performed exactly as for the conventional intra prediction modes; for the up-sampling used in the MIP-prediction, original reference samples being used instead of down-sampled ones; clipping being performed before up-sampling and not after up-sampling; MIP being allowed up to 64×64 regardless of the maximum transform size; or the number of MIP modes being 32 for sizeId=0, 16 for sizeId=1, and 12 for sizeId=2.

One or more MPM lists may be used. In examples, two MPM lists may be generated: a primary MPM (PMPM) list and a secondary MPM (SMPM) list. The PMPM list may include six entries (e.g., six MPMs) and the SMPM list may comprise 16 entries (e.g., 16 MPMs). A general MPM list (e.g., comprising the PMPM list and SMPM list) with 22 entries may be constructed. The first entry may be the planar mode. The other entries may be obtained from the intra modes of the left (L), above (A), below-left (BL), above-right (AR), and above-left (AL) neighboring blocks. The directional modes with added offset from the first two available directional modes of neighboring blocks may be included in the MPM list. One or more predefined (e.g., additional) default modes may be included in the MPM list. A redundancy check may be performed prior to adding an entry to the MPM list. For example, in the generation of the general MPM list of 22 entries described herein, when a given intra prediction mode index (e.g., the index of the intra prediction mode selected to predict the below-left luminance CB) is proposed as an addition to the current list of MPMs and the proposed index already exists in the current list, addition of the proposed index may be skipped.

The PMPM may be constructed from the first six entries (e.g., the first six MPMs) in the general MPM. Other entries (e.g., the rest of the entries) may form the SMPM list.

Figure 6:
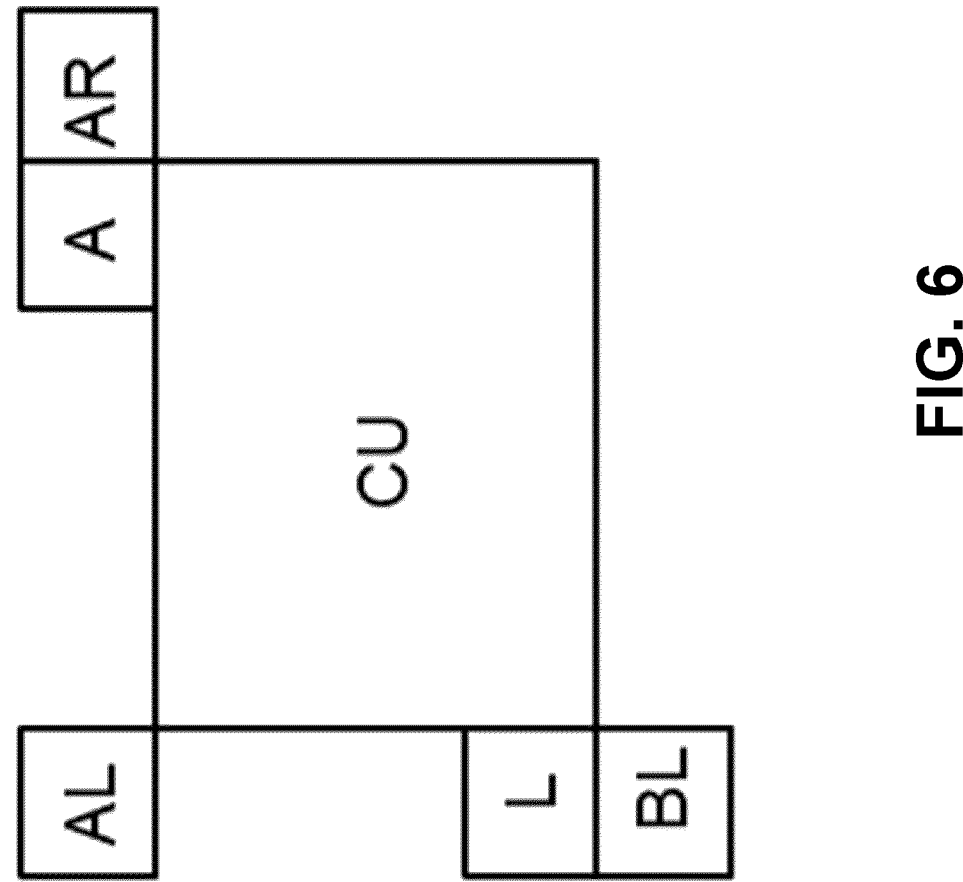
FIG. 6 may show an example of neighboring blocks of the current coding unit (CU).

FIG. 6 shows neighboring blocks of the current CU. As shown in FIG. 6, block A may be the above neighboring block, block AR may be above-right neighboring block, block AL may be the above-left neighboring block, block L may be the left neighboring block, and block BL may be the below-left neighboring block.

A syntax element corresponding to the PMPM list may be signaled in the bitstream. In examples, if the PMPM indication is equal to one, the index within the PMPM list may be parsed to determine the intra prediction mode. In examples, if the PMPM indication is equal to zero, another syntax element may be signaled for the SMPM list, and a second syntax element may be signaled to indicate the index inside the SMPM list.

For a given coding block, an MPM list generation process may be used to generate an MPM list for that coding block. MPM list generation may be performed using different MPM list generation processes for different coding blocks. For example, the MPM list generation process may be determined/selected based on whether an intra coding mode derivation process is enabled for the coding block. For example, the intra coding mode derivation process may be TIMD.

The device may determine that the intra coding mode derivation process is disabled (e.g., is not to be used in MPM list generation) for a coding block. In this case, a first MPM list generation process may be used to generate an MPM list for that coding block. For example, the first MPM list generation process may involve using DIMD for MPM list(s) generation (e.g., based on the intra coding mode derivation process being disabled). For example, for a given coding block, candidate intra prediction modes may be derived based on intra prediction modes associated with neighboring blocks of the coding block. As part of the MPM list generation process, a DIMD candidate may be derived based on a histogram of gradients associated with reconstructed pixels neighboring the coding block. The candidate intra prediction modes and/or the DIMD candidate may be added to an MPM list for the coding block. The coding block may be decoded based on (e.g., using) the generated MPM list. In examples, DIMD may generate two directional modes (e.g., in addition to planar mode), and the first and second modes may be added to the PMPM list. In some examples, one (e.g., only one) of the modes generated via DIMD may be added to the MPM list.

The device may determine the intra coding mode derivation process is enabled (e.g., is to be used in MPM list generation) for a coding block. In this case, a second MPM list generation process (e.g., different than the MPM list generation process used when the intra coding mode derivation process is disabled) may be determined/selected based on the intra coding mode derivation process being enabled for that coding block. The second MPM list generation process may be used to generate an MPM list for coding blocks when the intra coding mode derivation process is enabled. The coding block may be decoded based on (e.g., using) the MPM list generated using the second MPM list generation process.

For example, the second MPM list generation process may involve using TIMD for MPM list(s) generation (e.g., based on the first intra coding mode derivation process being enabled for the coding block). In examples, the MPM list may be generated based on candidate intra prediction mode(s) derived via TIMD. For example, the MPM generation process may involve testing a plurality of candidate intra prediction modes on reconstructed pixels neighboring the coding block and selecting candidate intra prediction mode(s) from the plurality of candidate intra prediction modes (e.g., based on the testing). The selected candidate intra predication mode(s) may be added to the MPM list.

Figure 7:
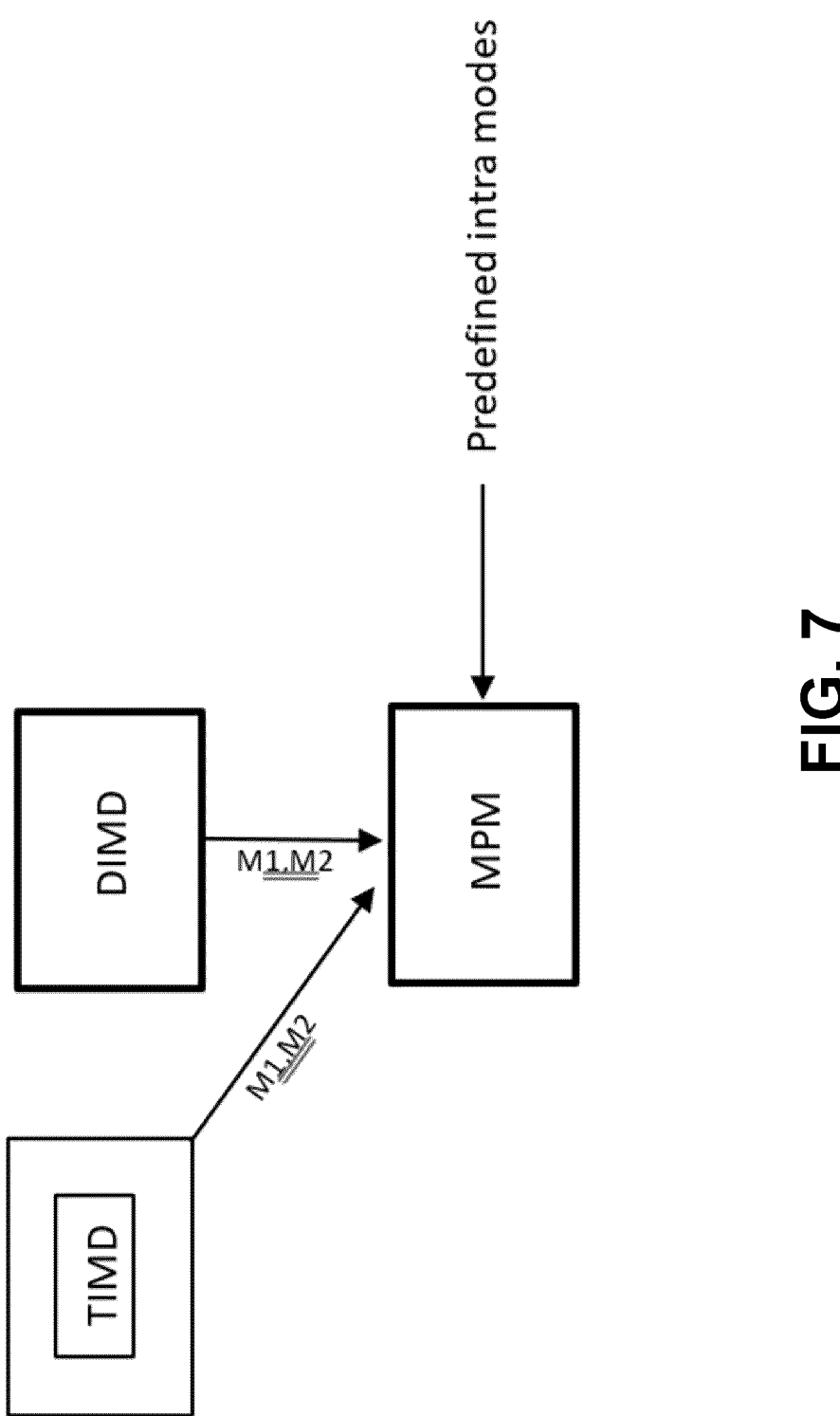
FIG. 7 shows an example of including two modes generated from template-based intra mode derivation (TIMD) in a most probable mode (MPM) list.

FIG. 7 shows an example of including two modes generated from TIMD in an MPM list. As shown in FIG. 7, including the two TIMD-generated modes (e.g., candidates intra prediction modes) may be similar to DIMD.

In examples, TIMD may be used for generating the primary MPM list. For example, derived candidate intra prediction mode(s) may be added to a primary MPM list, e.g., one of the MPM list. TIMD may generate two intra prediction modes and may perform blending to combine the two modes. For example, TIMD may result in generation of two modes, M1 and M2. The modes M1 and M2 may be included in the primary MPM list.

A redundancy check may be performed before a candidate mode is added to the MPM list (e.g., so that redundant modes are avoided). For example, whether to add a selected candidate intra prediction mode to the MPM list may be determined based on comparing the selected candidate intra prediction mode to prediction modes on the MPM list. If a derived candidate intra prediction mode (e.g., the selected candidate intra prediction mode) is the same as a prediction mode on the MPM list, the video processing device may refrain from adding the derived candidate prediction modes to the MPM list. In examples, if the primary MPM list already comprises M1 and/or M2, these modes may be excluded from the primary MPM list.

In examples, TIMD may be used to generate an intra prediction mode (e.g., only a single intra prediction mode). In such a case, the first mode (e.g., only the first mode) may be considered for MPM list generation.

In examples, the first mode derived via TIMD and the first mode derived via DIMD may be used in MPM list generation. In examples, the first mode derived via TIMD (e.g., only the first mode derived via TIMD) may be included in the MPM list. In such a case, the process of TIMD mode generation may be partially invoked for generating the first probable mode (e.g., instead of two modes).

DIMD may derive two close neighboring directional modes indices, (e.g., since the DIMD-derived directional mode index is often involved in the search for its neighboring directional modes indices and added to the general list of MPMs).

In examples, the first mode (e.g., only the first mode) may be derived via DIMD for MPM list generation, (e.g., instead of deriving two modes via DIMD).

In examples, TIMD and DIMD may be used to generate the secondary MPM list. For example, derived candidate intra prediction mode(s) may be added to the secondary MPM list. For example, DIMD and TIMD modes may be included in the SMPM list. The secondary MPM list may be less frequently used (e.g., compared to the primary MPM list). Two modes (e.g., each of the two modes) obtained from DIMD and two modes (e.g., each of the two modes) obtained from TIMD may be included in the secondary MPM list (e.g., as described herein) or the first mode (e.g., only the first mode obtained from TIMD and/or DIMD, as described herein) may be included in the secondary MPM list.

Mutual exclusion of TIMD and DIMD in MPM list generation may be implemented. In examples, either TIMD or DIMD modes may be included in the MPM list. A syntax element may indicate whether DIMD or TIMD is used for MPM list generation. For example, a video decoding device may receive a first indication that an intra coding mode derivation process (e.g., TIMD) is enabled for a first coding block and/or may receive a second indication that the intra coding mode derivation process is disabled for a second coding block. The decoder may determine whether to perform DIMD or TIMD based on the indication(s). In examples, DIMD may be performed to derive candidate prediction mode(s). If the mode(s) derived via DIMD is/are already included in the MPM list (e.g., generated from default mode(s)), TIMD may be performed to derive candidate prediction mode(s) for the MPM list. In examples, when DIMD is performed to derive candidate prediction mode(s) and the DIMD candidate prediction modes are added to the MPM list, TIMD may not be performed (e.g., may be bypassed). In examples, TIMD may be performed to derive candidate prediction mode(s). If the mode(s) derived via TIMD is/are already included in the MPM list, DIMD may be performed to derive candidate prediction mode(s) for the MPM list. In examples, when TIMD is performed to derive candidate prediction mode(s) and the TIMD candidate prediction modes are added to the MPM list, DIMD may not be performed (e.g., may be bypassed). In examples, whether to perform DIMD or TIMD may be based on a coding mode of the block.

Figure 8:
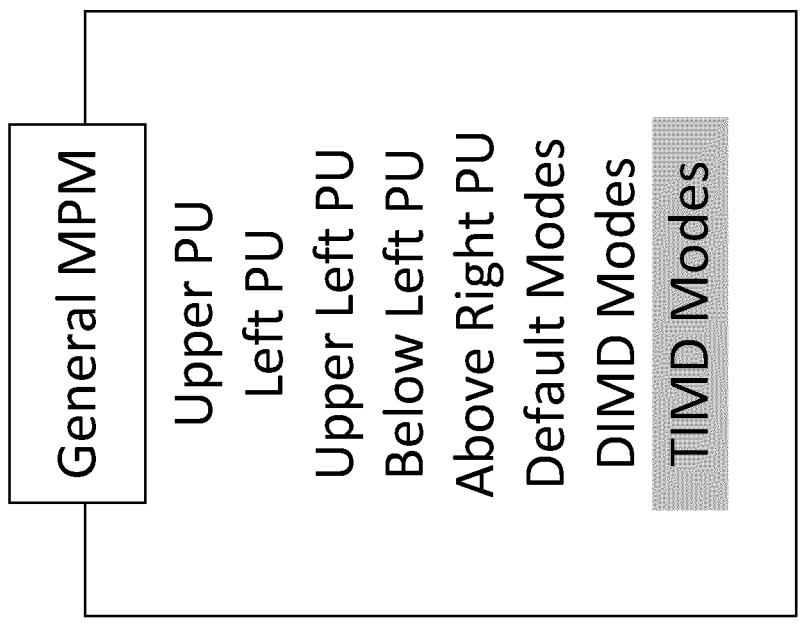
FIG. 8 illustrates an example MPM list for TIMD and an example general MPM list.

FIG. 8 illustrates an example MPM list for TIMD and an example general MPM list. As illustrated, the MPM list for TIMD may not include modes derived via DIMD. In examples, the general MPM list may include modes derived via DIMD (e.g., DIMD modes) and modes derived via TIMD (e.g., TIMD modes).

The MPM list may be used to deduce a prediction mode (e.g., the best prediction mode) by using the template pixels. One or more modes from an MPM list may be tested on the template pixels and one or more prediction modes (e.g., the best one or more prediction modes that minimize the prediction error) may be retained and considered as a TIMD mode. MPM list generation may involve including DIMD modes in the MPM list. For example, (e.g., at the decoder side) a DIMD process may be performed to derive DIMD mode(s). The DIMD mode(s) may be added to an MPM list (e.g., before performing a TIMD mode derivation process). In such a case, two consecutive processes of mode derivation may be performed (e.g., at the decoder side for decoding one coding block).

In examples, the MPM list generation process may involve deriving candidate intra prediction modes but bypassing deriving candidate modes via DIMD (e.g., DIMD mode(s) may be excluded or skipped from the MPM list that is used for a TIMD process). For example, a DIMD derivation (e.g., deriving candidate modes via DIMD) may be bypassed in MPM list generation when TIMD is used. For example, based on a determination that TIMD is used for a coding block, the MPM list may be generated with DIMD modes excluded from the list. The decoder may refrain from invoking the DIMD process when generating the MPM list. In examples, DIMD modes may be excluded from an MPM list when TIMD is used.

In examples, one or more techniques described herein may apply to combined intra-inter prediction (CIIP) mode. The MPM generation process for a coding block may be determined (e.g., selected from the different MPM generation processes) based on whether the prediction mode used for the coding block is CIIP mode. CIIP mode may combine inter prediction and intra prediction. In some example CIIP modes, the inter prediction mode may be obtained based on inter-template matching, and/or the intra prediction mode may be obtained based on TIMD. Intra prediction (e.g., generated with TIMD) may use MPM modes that include DIMD modes.

Whether the intra coding mode derivation process is enabled may depend on whether the prediction mode used for a coding block is CIIP mode. For example, a video decoding device and/or a video encoding device may determine that the intra coding mode derivation process is enabled when the prediction mode used for the coding block is CIIP mode. Based on the prediction mode for the coding block being CIIP mode, a first MPM generation process (e.g., a process that may skip (e.g., bypass) performing DIMD) may be used. Based on CIIP mode not being used for the coding block, a second MPM generation process (e.g., a process that may invoke DIMD) may be used.

Whether to skip (e.g., bypass) performing DIMD may be determined based on the coding mode. For example, performing DIMD may be skipped (e.g., bypassed) for a current coding block if certain coding mode(s), (e.g., CIIP mode) is used. DIMD modes may be excluded from an MPM list, for example, if the current prediction mode (e.g., the prediction mode for a current block) is CIIP. Excluding the DIMD modes (or bypassing DIMD) when CIIP is used may result in the derivation of two modes (e.g., rather than the derivation of three modes). For example, not all three of inter-template matching, DIMD, and TIMD may be (e.g., have to be) processed for a coding block.

TIMD process may be used to add MIP or machine learning (ML)-based mode(s) in the MPM list. In TIMD, potential candidates may be tested using a template on top of the block and correlating already decoded samples with predicted samples with a particular mode.

In examples, MIP and/or ML-based mode(s) may be tested using TIMD mode. For example, a shifted template on the top and/or left of the current coding block may be used as reference samples in TIMD. The reference samples may be used to predict one or more lines neighboring the current block. Correlation between the reference samples and current samples may be measured to assess whether the MIP and/or ML-based mode may be added to (e.g., included in) the MPM list.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A video decoding device comprising:
a processor configured to:
determine that a template-based intra coding mode derivation process is enabled for a coding block;
based on the template-based intra coding mode derivation process being enabled for the coding block, generate a most probable mode (MPM) list for the coding block based on a MPM list generation process, wherein decoder-side intra mode derivation (DIMD) is bypassed in the MPM list generation process; and
decode the coding block based on the MPM list.

2. The video decoding device of claim 1, wherein the processor being configured to generate the MPM list for the coding block based on the MPM list generation process comprises the processor being configured to:
derive a plurality of candidate intra prediction modes, wherein deriving candidate modes via DIMD is bypassed; and
add the plurality of candidate intra prediction modes to the MPM list.

3. The video decoding device of claim 1, wherein the coding block is a first coding block, the MPM list generation process is a first MPM list generation process, the MPM list is a first MPM list, and the processor is further configured to:
determine that the template-based intra coding mode derivation process is disabled for a second coding block;
based on the template-based intra coding mode derivation process being disabled for the second coding block, generate a second MPM list for the second coding block based on a second MPM list generation process, wherein DIMD is performed in the second MPM list generation process different from the first MPM list generation process; and
decode the second coding block based on the second MPM list.

4. The video decoding device of claim 3, wherein the processor being configured to generate the second MPM list for the second coding block based on the second MPM list generation process comprises the processor being configured to:
derive a plurality of candidate intra prediction modes based on intra prediction modes associated with neighboring blocks of the second coding block;
derive a DIMD candidate for the second coding block based on a histogram of gradients associated with reconstructed pixels neighboring the second coding block; and
add the plurality of candidate intra prediction modes and the DIMD candidate to the second MPM list for the second coding block.

5. The video decoding device of claim 3, wherein the processor is further configured to:
derive a plurality of candidate intra prediction modes for the second coding block based on a histogram of gradients associated with reconstructed pixels neighboring the second coding block, wherein the processor being configured to generate the second MPM list for the second coding block is further based on the derived plurality of candidate intra prediction modes.

6. The video decoding device of claim 1, wherein the processor being configured to generate the MPM list for the coding block based on the MPM list generation process comprises the processor being configured to:

test a plurality of candidate intra prediction modes on reconstructed pixels neighboring the coding block;

select a candidate intra prediction mode from the plurality of candidate intra prediction modes based on the testing; and add the selected candidate intra prediction mode to the MPM list.

7. The video decoding device of claim 6, wherein the processor is further configured to:

determine whether to add the selected candidate intra prediction mode of the plurality of candidate intra prediction modes to the MPM list by comparing the selected candidate intra prediction mode to prediction modes on the MPM list, wherein on a condition that the selected candidate intra prediction mode is the same as a prediction mode on the MPM list, the processor is configured to refrain from adding the selected candidate intra prediction mode to the MPM list.

8. The video decoding device of claim 1, wherein the processor being configured to generate the MPM list for the coding block based on the MPM list generation process comprises the processor being configured to:

test a plurality of candidate intra prediction modes on reconstructed pixels neighboring the coding block;

select a candidate intra prediction mode from the plurality of candidate intra prediction modes based on the testing;

add the selected candidate intra prediction mode to the MPM list;

derive a DIMD candidate for the coding block based on a histogram of gradients associated with reconstructed pixels neighboring the coding block; and add the DIMD candidate to the MPM list for the coding block.

9. The video decoding device of claim 1, wherein the processor being configured to decode the coding block is further based on the template-based intra coding mode derivation process, the processor is further configured to perform the template-based intra coding mode derivation process, and the processor being configured to perform the template-based intra coding mode derivation process comprises the processor being configured to:

test a plurality of candidate intra prediction modes in the MPM list on reconstructed pixels neighboring the coding block; and select a candidate intra prediction mode from the plurality of candidate intra prediction modes based on the testing.

10. The video decoding device of claim 1, wherein the processor being configured to generate the MPM list for the coding block further comprises the processor being configured to:

derive a plurality of candidate intra prediction modes; and add a derived candidate intra prediction mode of the plurality of candidate intra prediction modes to a primary MPM list of the MPM list; or add the derived candidate intra prediction mode of the plurality of candidate intra prediction modes to a secondary MPM list of the MPM list.

11. A method for video decoding, the method comprising:

determining that a template-based intra coding mode derivation process is enabled for a coding block;

based on the template-based intra coding mode derivation process being enabled for the coding block, generating a most probable mode (MPM) list for the coding block based on a MPM list generation process, wherein decoder-side intra mode derivation (DIMD) is bypassed in the MPM list generation process; and decoding the coding block based on the MPM list.

12. The method of claim 11, wherein generating the MPM list for the coding block based on the MPM list generation process comprises:

deriving a plurality of candidate intra prediction modes, wherein deriving candidate modes via DIMD is bypassed; and adding the plurality of candidate intra prediction modes to the MPM list.

13. The method of claim 11, wherein the coding block is a first coding block, the MPM list generation process is a first MPM list generation process, the MPM list is a first MPM list, and the method further comprises:

determining that the template-based intra coding mode derivation process is disabled for a second coding block;

based on the template-based intra coding mode derivation process being disabled for the second coding block, generating a second MPM list for the second coding block based on a second MPM list generation process, wherein DIMD is performed in the second MPM list generation process different from the first MPM list generation process; and decoding the second coding block based on the second MPM list.

14. The method of claim 13, wherein the generating the second MPM list for the second coding block based on the second MPM list generation process comprises:

deriving a plurality of candidate intra prediction modes based on intra prediction modes associated with neighboring blocks of the second coding block;

deriving a DIMD candidate for the second coding block based on a histogram of gradients associated with reconstructed pixels neighboring the second coding block; and adding the plurality of candidate intra prediction modes and the DIMD candidate to the second MPM list for the second coding block.

15. The method of claim 13, wherein the method further comprises:

deriving a plurality of candidate intra prediction modes for the second coding block based on a histogram of gradients associated with reconstructed pixels neighboring the second coding block, wherein generating the second MPM list for the second coding block is further based on the derived plurality of candidate intra prediction modes.

16. The method of claim 11, wherein generating the MPM list for the coding block based on the MPM list generation process comprises:

testing a plurality of candidate intra prediction modes on reconstructed pixels neighboring the coding block;

selecting a candidate intra prediction mode from the plurality of candidate intra prediction modes based on the testing; and adding the selected candidate intra prediction mode to the MPM list.

17. The method of claim 16, wherein the method further comprises:

determining whether to add the selected candidate intra prediction mode of the plurality of candidate intra prediction modes to the MPM list by comparing the selected candidate intra prediction mode to prediction modes on the MPM list, wherein on a condition that the selected candidate intra prediction mode is the same as a prediction mode on the MPM list, the method further comprises refraining from adding the selected candidate intra prediction mode to the MPM list.

18. The method of claim 11, wherein generating the MPM list for the coding block based on the MPM list generation process comprises:

testing a plurality of candidate intra prediction modes on reconstructed pixels neighboring the coding block;

selecting a candidate intra prediction mode from the plurality of candidate intra prediction modes based on the testing;

adding the selected candidate intra prediction mode to the MPM list;

deriving a DIMD candidate for the coding block based on a histogram of gradients associated with reconstructed pixels neighboring the coding block; and adding the DIMD candidate to the MPM list for the coding block.

19. The method of claim 11, wherein decoding the coding block is further based on the template-based intra coding mode derivation process, the method further comprises performing the template-based intra coding mode derivation process, and performing the template-based intra coding mode derivation process comprises:

testing a plurality of candidate intra prediction modes in the MPM list on reconstructed pixels neighboring the coding block; and selecting a candidate intra prediction mode from the plurality of candidate intra prediction modes based on the testing.

20. The method of claim 11, wherein generating the MPM list for the coding block further comprises:

deriving a plurality of candidate intra prediction modes; and adding a derived candidate intra prediction mode of the plurality of candidate intra prediction modes to a primary MPM list of the MPM list; or adding the derived candidate intra prediction mode of the plurality of candidate intra prediction modes to a secondary MPM list of the MPM list.

* * * * *